United States Patent [19]

Carroll et al.

[11] Patent Number: 4,485,118

[45] Date of Patent: Nov. 27, 1984

[54] GUM COMPOSITION WITH PLURAL TIME RELEASING FLAVORS AND METHOD OF PREPARATION

[75] Inventors: Thomas J. Carroll, Astoria, N.Y.; Deborah Feinerman, Asbury Park, N.J.; Robert J. Huzinec; Dominic J. Piccolo, both of Brooklyn, N.Y.

[73] Assignee: Warner-Lambert Company, Morris Plains, N.J.

[21] Appl. No.: 487,436

[22] Filed: Apr. 21, 1983

[51] Int. Cl.³ .............................................. A23G 3/30
[52] U.S. Cl. ........................................... 426/5; 426/3
[58] Field of Search ...................................... 426/3, 5

[56] References Cited

U.S. PATENT DOCUMENTS

| | | | |
|---|---|---|---|
| 2,886,446 | 5/1959 | Kramer et al. | 426/5 |
| 3,262,784 | 7/1966 | Bucher | 426/5 |
| 3,795,744 | 3/1974 | Ogawa et al. | 426/3 |
| 3,826,847 | 7/1974 | Ogawa et al. | 426/3 |
| 3,857,964 | 12/1974 | Yolles | 426/3 |
| 3,920,849 | 11/1975 | Marmo | 426/3 |
| 4,217,368 | 8/1980 | Witzel | 426/5 |
| 4,271,198 | 6/1981 | Cherukuri et al. | 426/3 |

*Primary Examiner*—Jeanette Hunter
*Attorney, Agent, or Firm*—Gary M. Nath; Daniel A. Scola, Jr.

[57] ABSTRACT

A gum composition and method for making the same is disclosed which contains a sequentially releasable plural flavor system comprised of different flavors. One of the flavors is encapsulated within a water-insoluble coating. A separate liquid flavor is introduced individually and is available for immediate release.

15 Claims, No Drawings

GUM COMPOSITION WITH PLURAL TIME RELEASING FLAVORS AND METHOD OF PREPARATION

BACKGROUND OF THE INVENTION

1. Field of the Invention

The present invention relates to flavored gum compositions, and particularly to gum compositions having plural flavor components.

2. Description of the Prior Art

Most chewing gums, including bubble gums, contain a generally water-insoluble gum base, water-soluble sweeteners that are either natural or artificial, and a flavoring that may be added in a variety of forms. Also, the gum may contain various additives such as plasticizers, softeners and bulking agents to improve consistency and to generally enhance the chewing experience.

A commonly noted deficiency in chewing gums has been the relatively rapid exhaustion of the flavor sensation during chewing. This deficiency is most pronounced in the instance of chewing gums, as flavor loss frequently occurs within the first 4 to 5 minutes of chewing.

The same problem is observed in the instance where the gum products are stored for a period of time between manufacture and consumption. The flavors appear to have limited shelf stability and, in some cases, are observed to diminish to an unacceptably low level within one month after storage.

Recently, it has become desirable to develop chewing gums and bubble gums containing plural diverse flavor components, to offer a flavor variation and overall flavor extension during the chew. Several efforts have been made to prepare chewing gums having diverse flavors, however these products have generally been unable to offer desirable flavor intensity of the respective flavor components, and accurate transition between the respective flavors. For example, U.S. Pat. No. 3,795,744 to Ogawa et al purports to offer a chewing gum having flavor variability achieved by forming a plurality of flavor composites prepared in granular form with certain high molecular weight compounds, both water-insoluble and water-soluble, which may thereafter be incorporated into a chewing gum base. Ogawa et al purport to achieve sequential flavor delivery by the modulation of the coating applied to the respective flavor particles. The flavors in Ogawa et al are added at the same stage of gum processing.

U.S. Pat. No. 3,826,847 also to Ogawa et al is cumulative in its disclosure with the earlier mentioned patent, as it likewise relates to the encapsulation of flavoring with high molecular weight materials such as those mentioned earlier. In other respects, however, Ogawa et al utilizes the same preparation and offers the same possibility for products so prepared.

U.S. Pat. No. 3,920,849 to Marmo et al addresses the concept of extended flavor release and offers a full discussion of the prior art on this subject. The patent directs itself to the preparation of separate flavor components identified as "fixed" (encapsulated) and "unfixed", which are mixed with a suspension agent prior to their addition to a chewing gum base. The patentees contend that this method of preparation and addition to the chewing gum offers improved flavor intensity and uniform flavor transmission in the instance where plural diverse flavors are utilized. The patentees specifically employ a non-confined hydrophobic flavor oil and a "fixed" hydrolytically releasable flavor oil in combination with a solid suspending agent, as their flavor system. The preparation of the flavors is such that the resulting flavor system is added simultaneously to the gum base.

In similar fashion, U.S. Pat. No. 4,001,438 also to Marmo et al discloses a flavor composition utilizing a non-confined flavor oil in combination with a flavor oil physically entrapped within solid particles, and a suspending agent combined therewith. All of these ingredients are premixed and thereafter simultaneously added to the product to be flavored. It is significant that the flavor system of this patent is predicated upon an intimate admixture between the non-confined flavor oil and the entrapped flavor oil.

U.S. Pat. No. 4,259,355, also to Marmo et al is effectively cumulative upon the earlier issued Marmo et al patents, in that it teaches the preliminary combination or admixture of a non-confined flavor oil and entrapped flavor oil and a suitable suspending agent. In the '355 patent, the respective flavors are prepared with a cellulosic suspending agent and are thereafter mixed, and the resulting flavor composite is thereafter added to the chewing gum, tobacco etc.

British Patent No. 1,327,761 to Smith et al discloses a compound encapsulation of a flavoring, wherein a first water-soluble encapsulant is applied to the flavor and a second water-insoluble encapsulant is thereafter applied. The water-insoluble encapsulant is critically identified as having a melting point substantially below that of the water-soluble encapsulating material, to provide the desired qualities of the product. There is no disclosure in the British Patent, however, of the preparation of gum compositions having plural flavors offering time controlled variant flavor release characteristics. Efforts to prepare gum compositions with plural flavors, in accordance with the disclosures just discussed nonetheless result in products having certain deficiencies. In particular, the simultaneous addition of the flavors to the gum base frequently results in masking of the first non-confined flavor and general attenuation of both flavor sensations. Similarly, the flavor systems are sensitive to subsequent mechanical processing of the gum composition and frequently exhibit reduced flavor intensity as a result of later mixing and extrusion of the final product. Lastly, the encapsulated materials frequently break down prematurely with the result that discrete flavor release is lost and overall flavor duration is undesirably reduced.

A need therefore exists for the development of a chewing gum and a flavor system suitable for same that offers improved extension of flavor sensation in combination with desirable flavor intensity, shelf life and discrete flavor transition.

SUMMARY OF THE INVENTION

In accordance with the present invention, a gum composition is prepared that contains a sequentially releasable plural flavor system comprising a gum base having distributed therein an encapsulated flavor component having a water-insoluble coating disposed thereover and an independently disposed primary liquid flavor. The liquid flavor component is prepared from a flavor other than that of the encapsulated flavor component and both flavor components are separately added to the gum base. Preferably, the encapsulated flavor component is first interdispersed with a quantity of the gum base to form a first mixture. The liquid flavor oil, which may be aqueous or non-aqueous, is added to the gum preparation at a separate and later stage, after bulk or incremental additions of sugar or other solid powdered materials have been made. The amount of liquid flavor present with respect to the encapsulated flavor may vary up to a suggested maximum of 1.5 times the latter, as calculated by weight, to avoid masking the encapsulated flavor. The present chewing gum compositions may also include conventional chewing gum additives, such as coloring agents, natural and artificial sweeteners, fillers, plasticizers, elastomer solvents, elastomers, softeners and the like.

The present invention also relates to a method for preparing the chewing gum composition with the sequentially releasable, plural flavor system, which comprises preparing a first mixture of a gum base and a water-insoluble encapsulated flavor component. Adding to the first mixture the conventional gum additives discussed above; other than the primary liquid flavor; which includes non-aqueous particular material selected from the group consisting of sugar, compatible inert fillers, plasticizers, softeners, colorants, elastomer solvents, aqueous components, and so forth, and mixtures thereof, to form a second mixture, and then adding a liquid flavor component to form a third mixture and thereafter adding any remaining desired ingredients to form the final chewing gum composition.

Preferably, the encapsulated flavor component is first interdispersed with a quantity of the gum base, to which liquid softeners, plasticizers and the like are then added. This is followed by at least one and preferably plural incremental additions of powdered ingredients such as sugar or sugar free solids in the instance where an artificially sweetened product is desired, after which additional liquid softeners, plasticizers and the like and the liquid flavor component are thereafter added. Significantly, addition of the liquid flavor component in conjuction with powdered sugar and the like has been found to enhance flavor release when added subsequent to the addition of the encapsulated flavor component.

In a preferred embodiment, the present method comprises the initial combination of the encapsulated flavor with the gum base, followed by the addition of one or more incremental amounts of powdered materials such as specified, with intermittent blending at each addition, wherein the liquid flavor is added at a distinct later stage with respect to the encapsulated flavor.

The resulting composition offers a unique coaction between the respective flavor components, as the manner in which they are added to the gum composition appears to minimize any undesirable interaction that may take place when simultaneous preparation and addition techniques are utilized. The later addition of the liquid flavor component reduces attenuation that is believed attributable to the adverse effects of gum processing; likewise, the delay in the addition of the aqueous ingredients to the gum composition is believed to reduce the attenuation of the encapsulated flavor components when the encapsulated coating is not uniformly applied.

Gum compositions prepared in accordance with the present invention offer improved flavor intensity and clarity of flavor transition, as well as overall extension of the flavor sensation. The present invention is susceptible of modification within its scope to include a plurality of differing flavor components to achieve multiple flavor transitions. Likewise, a variety of flavors may be prepared in both the liquid and encapsulated form. The flavors would include the various natural and synthetic flavor oils and essences known in the art.

DETAILED DESCRIPTION

The present invention comprises a gum composition having a flavor system offering sequential time release of plural and different flavor components. The flavor components comprise a primary liquid flavor component so named because it is the first to be experienced when the chewing gum is chewed. The secondary encapsulated flavor component is so named as it is experienced after the concentration of the primary flavor component is decreased such that the secondary flavor perception is experienced, and thus the flavor transition is perceived.

The flavor system of the present invention has as one of its essential features that the respective flavor components bear different flavors and are separately and individually incorporated in the gum base or matrix. Thus, the secondary or encapsulated flavor component is initially incorporated into the gum base as a plurality of flavor particles coated with a water-insoluble encapsulant. The encapsulated flavor component is added at an early stage in the preparation of the chewing gum composition, to achieve uniform interdispersion of the encapsulated flavor within the gum base without hindrance from other additives. This procedure enables the encapsulated flavor particles to be completely surrounded by the gum base which action subsequently hinders their removal when the soluble components, such as sweeteners, are removed by the chewing process. In contrast, the liquid flavor component is added in its unconfined form at a later stage of processing, just prior to the completion of gum formulation so that it can be removed easily upon chewing.

The encapsulated flavor component is preferably prepared with a water-insoluble encapsulating or coating material. Suitable water-insoluble materials include certain vinyl polymers, polyolefins, polyesters, waxes, gums, protein end the like. For example, suitable polyolefins may include polyisobutylene, polypropylene, polyisoprene, copolymers thereof and the like. Suitable vinyl polymers may include polyvinyl acetate and polyvinyl alcohol. The specific water-insoluble coating material may vary within the skill of the art and the scope of the present invention.

Suitable waxes include carnuiva and paraffin. Exemplary gums include natural and synthetic gums. Natural gums include locust bean gum, gum acacia, pectin, gum tragacanth, guar gum, carageenan gum, shellac and arabinogalactin. Synthetic gums include carboxymethyl cellulose, and ethyl cellulose. Suitable proteins include egg albumen and hydrolyzed vegetable protein.

Polyesters include any of the thermosetting synthetic resins which are polycondensation products of dicarboxyllic acids with dihydroxy alcohols. Most polyesters contain ethylenic unsaturation, generally introduced by unsaturated acids. The principal unsaturated acids used are maleic and fumaric acid. Suitable saturated acids such as phthalic and adipic acid may also be included. The dihydroxy alcohols most generally are ethylene-, propylene-, diethylene- and dipropylene glycols. Styrene and diallyl phthalate may also be used as common cross-linking agents. Suitable coating agents also include modified starch and its derivatives, including dextrin, as well as hydrolyzed gums and hydrolyzed gelatin.

The flavors useful in accordance with the present invention include those flavors already well known for use in food applications and more particularly, those flavors utilized with chewing gums and bubble gums. Thus, for example, the flavors may include those derived from essential oils, as well as those flavors characterized as either natural or artificial fruit flavors. Essential oils would include flavors such as cinnamon, spearmint, peppermint, birch, anise and the like; natural fruit flavors derived from fruit essence include apple, pear, grape, peach, strawberry, cherry, apricot, orange, watermelon, banana and the like; bean-derived flavors are also included, and comprise coffee, cocoa, cola and the like; other flavors such as nut-derived flavors including peanut and almonds, and other pungent materials are likewise contemplated and may be appropriately prepared.

Of the flavors above mentioned, certain flavors have been prepared and are contemplated for encapsulation. In particular, the fruit-derived flavors banana, lemon, lime and grapefruit, the bean-derived flavor cola and the nut essence flavor of almond have been encapsulated. Naturally, other flavors are contemplated and would be suitably encapsulated in accordance with the present invention.

Also, the flavors mentioned above could be prepared in liquid form and could thereafter be placed in various combinations of diverse flavors, such combinations established to gain a specific flavor transition. For example, the following flavor combinations are proposed wherein the first mentioned flavor is in liquid form and the second mentioned flavor is encapsulated and thus is experienced later; cherry-cola., grapefruit-lime/lemon; lime/lemon-grapefruit; lemon-lime; pineapple-banana; pineapple-coconut; orange-cream; strawberry-cream; cherry-vanilla; and chocolate-marshmallow. Naturally the foregoing combinations are illustrative of schemes for flavor combination that would offer individual beneficial sensations and the present invention is believed to extend in scope beyond the specific combinations set forth herein and to include more than two different flavors.

With respect to the water-insoluble, encapsulated flavor component, the particles thereof may be prepared by a variety of well known techniques, including spray-drying, coascervation, and the like. The exact manner by which the encapsulation is carried out is not critical, however preferably such processing is conducted at the lowest possible temperature to avoid undue volatilization or "flashing off" of the flavor ingredient. A representative process is described in U.S. Pat. No. 4,276,312 to C. G. Merritt entitled "Encapsulation of Materials" which patent disclosure is incorporated herein by reference. The particle size of the encapsulated flavor is not critical except to the extent that it can be incorporated into the chewing gum base.

The amount of flavoring material in the encapsulated flavor component may naturally vary with the specific end use of the flavor system. For example, the flavor may comprise an illustrative 5-25% and preferable 10-20% by weight of the encapsulated flavor component. This percentage may naturally vary within the scope of the present invention. As the amount of flavor present in the encapsulated particle increases, a corresponding increase in flavor intensity is noted. This is generally attributable to the thickness of the water-insoluble coating encapsulating the flavor oil; that is, thicker coatings delay flavor oil release with corresponding reduced flavor intensity, whereas thinner coatings expedite flavor oil release with concurrent increased flavor intensity because of higher flavor oil concentrations.

Generally, the present invention contemplates the incorporation of the encapsulated flavor component within the essentially non-aqueous phase of the composition, while the liquid or primary flavor component is incorporated in the aqueous phase. This phase separation of the flavor components in conjunction with the separation in their sequence of addition to the gum composition, comprises one of the features of the present invention, as it limits the undesirable interaction between the respective flavor components that has been determined to attenuate flavor intensity and longevity. Thus, the liquid flavor component may be added and may reside within or adjacent to the aqueous ingredients of the gum composition, such as corn syrup, sorbitol and the like, all mentioned later on herein. By contrast, the encapsulated flavor component is added directly to the gum base and incorporated initially therein as one of the preliminary steps in the preparation of the present gum composition. Details regarding the method for preparing the present gum composition will be explored in greater depth later on herein.

The present gum composition includes a variety of well known ingredients all present for their corresponding functions. The amount of gum base employed will vary greatly depending on factors such as the type of base used, the consistency desired and other components used to make the final product. Thus, the gum base of the present invention may be present in an amount ranging broadly from about 5% to about 45% by weight of the final gum composition, and more particularly may be present in an amount ranging from about 15% to about 25% by weight. The gum base may be any water-insoluble gum base well known in the art. Suitable gum base materials include without limitation substances of vegetable origin such as chicle, jelutong, guttakay, and crown gum; synthetic elastomers such as butadiene-styrene copolymers, isobutylene-isoprene copolymers, polyethylene, polyisobutylene, and polyvinyl acetate, and the like.

The gum base composition may contain elastomer solvents to aid in softening the rubber component. Such elastomer solvents may comprise methyl, glycerol or pentaerythritol esters of rosins or modified rosins, such as hydrogenated, dimerized or polymerized rosins or mistures thereof. Examples of elastomer solvents suitable for use herein include pentaerythritol ester of partially hydrogenated wood rosin, pentaerythritol ester of wood rosin, glycerol ester of partially dimerized rosin, glycerol ester of polymerized rosin, glycerol ester of tall oil rosin, glycerol ester of wood rosin and partially hydrogenated wood rosin, and partially hydrogenated methyl ester of rosin and mixtures thereof. The solvent may be employed in an amount ranging from about 10% to about 75% and preferably about 45% to about 70% by weight of the gum base.

The aqueous phase of the present gum composition is usually comprised of liquid softeners, which may be present in an amount ranging from about 5% to about 40% by weight of the final gum composition, and preferably in an amount ranging from about 10% to about 25% by weight thereof. Various liquid softeners are contemplated and would include materials such as corn syrup, sorbitol sol, hydrogenated starch hydrolysate, and combinations thereof. These materials are added to provide the desired texture to the final gum composition product, and to thereby enhance the chew. A feature of the present invention is that the liquid softeners are added after the encapsulated flavor is incorporated into the gum base.

The gum composition may include plasticizers in amounts ranging up to about 5% and preferably to about 0.5%. Plasticizers serve in similar capacity to the softeners mentioned above to impart desired texture and consistency to the gum product. The plasticizers may include materials such as glycerin, lecithin, hydrogenated cotton seed oil, stearic acid, sodium stearate, potassium stearate, glyceryl triacetate, mineral oil, vegetable oil and the like which may be utilized either individually or in admixture.

The gum compositions generally contain a major portion of a sweetening agent. Sweetening agents may be selected from a wide range of materials such as water-soluble sweetening agents, water soluble artificial sweeteners, and dipeptide based sweeteners, including mixtures thereof. Without being limited to particular sweeteners, representative illustrations encompass:

A. Water-soluble sweetening agents such as monosaccharides, disaccharides and polysaccharides such as xylose, ribose, glucose, mannose, galactose, fructose, dextrose, sucrose, sugar, maltose, partially hydrolyzed starch, or corn syrup solids and sugar alcohols such as sorbitol, xylitol, mannitol and mixtures thereof.

B. Water-soluble articificial sweeteners such as the soluble saccharin salts, i.e. sodium or calcium saccharin salts, cyclamate salts and the like, and the free acid form of saccharin.

C. Dipeptide based sweeteners include L-aspartyl-L-phenylalanine methyl ester and materials described in U.S. Pat. No. 3,492,131 and the like.

In general, the amount of sweetener will vary with the desired amount of sweetener selected for a particular chewing gum. This amount will normally be about 0.01% to about 90% by weight when using an easily extractable sweetener. The water-soluble sweeteners described in category A are preferably used in amounts of about 25% to about 75% by weight, and most preferably about 50% to about 65% by weight of the final chewing gum composition. In contrast, the artificial sweeteners described in categories B and C are used in amount of about 0.01% to about 5.0% and most preferably about 0.05% to about 0.25% by weight of the final chewing gum composition. These amounts are necessary to achieve a desired level of sweetness independent from the flavor level achieved from the flavor oil.

The sweetener is preferably provided in dry, powdered form. The exact manner and sequence of addition of the sweetener to the present gum composition is not critical except that it follow the incorporation of the encapsulated flavor component in the gum base. The sweetener may be added in bulk or incrementally. Incremental addition precedes the addition of the liquid flavor and it is found that, when such addition is made the intensity of liquid flavor release is improved. With respect to the flavor system, the amount of flavoring present may range up to about 4% by weight of the gum composition, with the encapsulated flavor component and the liquid flavor component ranging up to about 2.0% each. More particularly, the encapsulated flavor component may range from about 0.1% to about 2.0% by weight and in a preferred embodiment may be utilized in an amount of about 0.4 to 1.0%. The liquid flavor component may be broadly available in an amount ranging from about 0.15% to about 3.0%, with a preferred exemplary quantity of 0.6% to 1.5% useful in accordance with the present invention. Naturally, the foregoing amounts of flavoring are presented for illustration and will vary depending upon the flavor used and the overall composition of the product in which the flavor system is incorporated.

With regard to the respective components of the flavor system, however, it is advisable that the liquid flavor component not exceed the encapsulated flavor component in an amount by weight greater than 1.5 times thereof. Greater amounts of liquid flavor component should be avoided as they will tend to mask the flavor release of the encapsulated flavor component.

The chewing gums of the invention may likewise contain additional conventional additives, including fillers such as aluminum hydroxide, alumina, aluminum silicates, calcium carbonate, talc, dibasic calcium phosphate (anhydrous and dehydrate) and mixtures thereof; coloring agents such as titanium dioxide; emulsifiers such as lecithin and glyceryl monostearate; and other conventional chewing gum additives known to those in the chewing gum art. The exact amount of such additives may vary so that they may be included as needed. With respect to the fillers, these materials may be included in dry powdered form in combination with the sweetener and, in certain amounts, will affect the speed of release of the liquid flavor component. Thus, for example, relatively large quantities of talc, calcium carbonate or other fillers may cause the speed of release and dissolution of the liquid flavor component to increase; correspondingly, reduced amounts of the filler material may decrease flavor release. Without being limited hereto, useable amounts of fillers may range up to about 40% by weight.

The present invention also relates to a method for the preparation of the present chewing gum composition which method in its broadest aspect comprises combining the gum base and the water-insoluble, encapsulated flavor component with each other to form a first mixture. This blending operation is performed by conventional means while heating the gum base to plasticize the blend. The heating temperature may vary widely but is for practical purposes preferably about 70° C. to 120° C. The first mixture is then blended with the conventional chewing gum additives excluding the primary flavor, such as the sugar or filler components, plasticizers, softeners, emulsifiers, or coloring agents to form a second mixture. The liquid flavor component is then added and mixed to form the final chewing gum composition.

The first step of the present method presumes the preparation of the encapsulated water-insoluble flavor component as mentioned earlier, and contemplates the incorporation of the encapsulated flavor into the gum base before addition of the primary flavor. Specifically, the encapsulated flavor component is added to the gum base and thoroughly mixed therewith by blending to form a homogenous mass. It is generally noted that the foregoing steps result in the formation of encapsulated flavor particles being interdispersed in the initial gum base. These composite particles are accordingly uniformly distributed throughout the gum base matrix and in accordance with a feature of the present invention are thereby assured of properly timed fracture and release during chewing. Generally, upon the gradual reduction of the liquid primary flavor and dissolution of soluble particles, these encapsulated particles are made available for release of flavor by physical crushing of the encapsulation coating resulting in release of the secondary flavor component.

The next step in the process, comprising the addition of gum additives including particulate material may comprise a sequence of incremental additions. Each addition may be followed by thorough mixing with the primary batch of gum base, to achieve final uniformity. In a preferred embodiment, corn syrup, sorbitol sol and the like are added to the first mixture followed by addition of the sweetener. The sweetener may be added in equal or consecutive increments, followed by the addition of coloring agents, plasticizers and so forth. The liquid flavor is introduced into the gum base last. The resulting mixture is agitated to obtain a uniform pliable mass from which the final gum product will be prepared.

The present process distinguishes the prior art in two respects, in that the flavor components are added separately and at diverse stages of processing, and that the primary flavor is added last. Both of these measures have been determined to favorably affect the intensity and individual integrity of the respective flavor components, and appear to result in a gum product that retains its flavor intensity and quality despite subsequent processing. Thus, prior art gum compositions were found to be adversely affected by standard gum processing procedures such as mixing and extrusion. By contrast, the gum composition of the present invention retains flavor intensity and integrity throughout such procedures and can accordingly be processed without limitation to form a variety of gum products.

The chewing gums of the invention may be in any form known in the art, such as stick gum, slab gum, chunk gum, shredded gum, hard coated gum, as well as center-filled gum.

The following examples are given to illustrate the invention, but are not deemed to be limiting thereof. All percentages given throughout the specification are based upon weight unless otherwise indicated.

EXAMPLE I

A gum base was added to a steam jacketed kettle equiped with a sigma blade mixer. The base was melted and adjusted to a temperature of about 88° C. to about 105° C.

The encapsulated flavor in particulate form was then added to the molten gum base and mixed for about 1.5 minutes to disperse the encapsulated flavor throughout the gum base. The encapsulated flavor was thereby trapped within or otherwise protected by the gum base.

Thereafter, a quantity of powdered sugar was added and thoroughly mixed with the modified gum base. The sugar was added in 3 equal increments, with the first $\frac{1}{3}$ added and mixed with the gum base for about 2 minutes. The second $\frac{1}{3}$ was then added and blended for about 1 minute. This procedure was followed as it results in a greater protection to the encapsulated flavor from the aqueous portion of the formula. The remaining increment of sugar and all non-aqueous materials were then added to the gum base under agitation. The materials added include glycerin, cottonseed oil, and the liquid flavor. The mixture was then blended until its texture became non-cohesive and the gum base mass began to separate. Mixing at this stage was conducted for approximately 1 to 2 minutes.

The aqueous phase of the gum composition was then added, by the introduction of corn syrup and its mixture with the gum base mass until the total mass became a homogeneous blend. This last mixing sequence was conducted for approximately 1 to 2 minutes. Mixing was then continued for 2 to 3 minutes further to prepare a soft, pliable mass that was removed from the kettle, rolled and cut into chewing gum chunks.

The composition of the resulting gum product is set forth below.

| INGREDIENTS | % BY WEIGHT |
|---|---|
| gum base | 17.49 |
| encapsulated cola flavor | 0.9 |
| sugar (pulverized) | 54.20 |
| liquid flavor (cherry) | 0.72 |
| cottonseed oil | 0.23 |
| glycerin solution (50% water) | 0.62 |
| corn syrup | 25.84 |

COMPARATIVE EXAMPLE A

The ingredients used in Example I were employed using the conventional procedures known in the art. Thus, the gum base was added to a steam jacketed kettle equiped with a sigma blade mixer. The base was melted and adjusted to a temperature ranging from about 88° C. to about 105° C.

The encapsulated flavor, cottonseed oil and corn syrup were then added to the molten gum base and mixed for about 1.5 minutes to disperse the syrup and flavor throughout the gum base. The encapsulated flavor was suspended in a corn syrup matrix present in the gum base.

The powdered sugar was then added and thoroughly mixed with the modified gum base for about 2 minutes, during which time the softeners and liquid flavor were also added.

Mixing was continued for 2 to 3 minutes to prepare a soft, pliable mass that was removed from the kettle, rolled and cut into chewing gum chunks.

The samples produced by the procedures of Examples I and Comparative Example A were analyzed using a 9 member organoleptic panel test evaluation. It was found that the gum formulation of Example I, illustrating the present invention, demonstrated efficient sequential time delivery of the respective flavor components, as the first cherry flavor was released immediately upon chewing, and the second encapsulated cola flavor was not preceived until the cherry flavor was at a low level following approximately 2 to 3 minutes of chewing. At that time, the cola flavor became the dominant flavor and emerged with acceptable flavor intensity. By contrast, the formulation of Comparative Example A did not deliver the separate flavor perception achieved by the formulation of Example I.

EXAMPLE II

The procedure of Example I was repeated with the exception that the resulting soft, pliable mass was removed from the kettle and it was extruded and formed into rectangular ropes, and thereafter cut into pieces. The particular composition of the gum prepared in this example is set forth below.

| INGREDIENTS | % BY WEIGHT |
| --- | --- |
| gum base | 17.49 |
| Encapsulated Cola Flavor | 1.0 |
| sugar (pulverized) | 54.02 |
| liquid flavor (cherry) | 0.8 |
| cottonseed oil | 0.23 |
| glycerin solution (50% water) | 0.62 |
| corn syrup | 25.84 |

COMPARATIVE EXAMPLE B

The ingredients used in Example II where employed using the conventional procedures of the prior art.

The procedure of Comparative Example A was repeated with the exception of the resulting soft pliable mass was removed from the kettle and processed as with the inventive gum formulation of Example II. The samples produced by the procedures of Examples I and Comparative Example B were also analyzed by means of a 9 member organoleptic panel test evaluation. The chewing gum formulation of Example II demonstrated efficient sequential time delivery of the 2 flavoring additives. This sequential delivery occurred over a period of approximately 1.5 to 2 minutes of chewing the gum piece.

By contrast, the comparative chewing gum formulation did not deliver the separate flavor perception observed with the sample derived from Example II.

EXAMPLE III

The procedure of Example II was repeated with the exception that the content of liquid flavor component was increased in relation to the amount of the encapsulated flavor component. The specific formulation is set forth below.

| INGREDIENTS | % BY WEIGHT |
| --- | --- |
| gum base | 17.49 |
| encapsulated cola flavor | 0.75 |
| sugar (pulverized) | 54.29 |
| liquid flavor (cherry) | 0.8 |
| cottonseed oil | 0.23 |
| glycerin solution 50% water | 0.62 |
| corn syrup | 25.84 |

COMPARATIVE EXAMPLE C

The ingredients used in Example III were employed but were prepared by the conventional procedures known in the prior art.

Accordingly, the procedures of Comparative Example B were repeated with the exception that the content of liquid flavor and encapsulated flavor were correspondingly modified as with Example III.

Samples of both chewing gums were analyzed by a 9 member organoleptic panel test evaluation, and a clear differentiation was again observed in the sequential delivery of flavor sensation with the sample of the invention. By contrast, the comparative formulation did not achieve the sequential flavor preception.

A further observation with respect to the formulation of Example III, is that the variation in the respective quantities of the flavor components did not impact the release rate of the respective flavors. That is, the release rates for each of the flavor components remain the same, so that a clear demarkation was achieved between the termination of the sensation of the liquid flavor component, and the onset of sensation attributable to the encapsulated flavor component.

In general, multiple flavor release systems prepared in accordance with the present invention operate with a delay in release between respective flavors that may vary widely. Preferably, the flavor system is prepared so that the delay between the first and second flavor may range in duration from about 1 to about 5 minutes. Generally, the initial chew does not crush the encapsulated flavor component, so that it remains concealed during the release of the liquid flavor component. Only after the sugar is dissolved and removed from the gum formulation along with the first flavor do the particles of the encapsulated flavor component become vulnerable to rupture and release of their contents.

A particular flavor release scenario has been developed and is set forth with release to a liquid cherry flavor and an encapsulated cola flavor. In this scenario, the cherry is theorized to extend for the initial 2 to 4 minutes of the chew, after which the cola flavor emerges. Thereafter, the flavor reverts to the liquid cherry for what is postulated to be approximately 10 minutes of total flavor sensation. More particularly, the formulation was prepared wherein the cherry flavor was experienced for approximately 2 to 4 minutes of the initial chew, a cherry cola mixture was then experienced for 1 to 2 minutes and a predominant cola flavor followed for the next 2 to 4 minutes of chew. Thereafter, a cherry cola flavor again emerged, which was followed by a predominant, mild cherry flavor. The foregoing scenario is exemplary of flavor patterns that can be established faithfully and accurately in accordance with the present invention. Naturally, 5 specific flavor patterns may vary depending upon the flavors used and their respective amounts present.

This invention may be embodied in other forms or carried out in other ways without departing from the spirit or essential characteristics thereof. The present disclosure is therefore to be considered as in all respects illustrative and not restrictive, the scope of the invention being indicated by the appended claims, and all changes which come within the meaning and range of equivalency are intended to be embraced therein.

What is claimed is:

1. A chewing gum composition having sequentially releasable, plural different flavors, comprising a gum base portion and a chewing gum portion, said gum base portion having dispersed separately therein at least one encapsulated flavor component, said encapsulated flavor component having a water-insoluble coating and being in the substantially anhydrous condition within said gum base, and said chewing gum portion containing a second primary liquid flavor component having a flavoring different from the flavoring of said encapsulated flavor component said liquid flavor component being distributed throughout said gum composition and substantially separate from said encapsulated flavor component, wherein said primary liquid flavor component is present in amounts of about 0.15% to about 3.0% by weight and said encapsulated flavor component is present in amounts of about 0.1% to about 2.0% by weight.

2. The gum composition of claim 1 wherein said water-insoluble coating comprises a material selected from the group consisting of vinyl polymers, polyolefins, waxes, gums and mixtures thereof.

3. The gum composition of claim 1 wherein said encapsulated flavor component is present in the amount of about 0.1% to about 2.0% by weight and the liquid flavor component is present in the amount of about 0.15% to about 3.0% by weight.

4. The chewing gum composition of claim 1 wherein said encapsulated flavor component is present in the amount of about 0.4% to about 1% by weight and the liquid flavor component is present in the amount of about 0.6% to about 1.5% by weight.

5. The chewing gum composition of claim 1, which additionally contains a material selected from the group consisting of sweeteners, plasticizers, softeners, elastomers, elastomer solvents, fillers, coloring agents and mixtures thereof.

6. The chewing gum composition of claim 1 wherein said liquid flavor component is present in an amount that does not exceed 1.5 times the amount by weight of said encapsulated flavor component.

7. The chewing gum composition of claim 1 wherein said gum base has distributed therein a plurality of sweetener particles.

8. The chewing gum composition of claim 7 wherein said liquid flavor component is introduced into and present within said gum composition in admixture with a quantity of said sweetener particles.

9. The chewing gum composition of claim 1 further including a gum base ingredient selected from the group consisting of natural rubber, synthetic rubber, and mixtures thereof.

10. The composition of claim 9 wherein the natural rubber is selected from the group consisting of chicle, jelutong, balata, gutta-percha, lechi caspi, sorva and mixtures thereof.

11. The chewing gum composition of claim 9 wherein the synthetic rubber is selected from the group consisting of butadiene-styrene copolymers, polyisobutylene, isobutylene-isoprene copolymers and mixtures thereof.

12. The chewing gum composition of claim 5 wherein the sweetening agent is selected from the group consisting of water-soluble sweetening agents, water-soluble artificial sweeteners, dipeptide based sweeteners and mixtures thereof.

13. The chewing gum composition of claim 1 wherein the liquid flavor component and the encapsulated flavor component are respectively selected from the group consisting of cherry-cola, grapefruit-lime/lemon; lime/lemon-grapefruit; lemon-lime; pineapple-banana; pineapple-coconut; orange-cream; strawberry-cream; cherry-vanilla; and chocolate-marshmallow.

14. A method of preparing a chewing gum composition having a sequentially releasable, plural flavor system comprising:
   a. combining a gum base and a water-soluble encapsulated flavor component to form a first mixture whereby the water-insoluble encapsulated flavor component is dispersed within the gum base;
   b. adding to said first mixture a chewing gum additive selected from the group consisting of sweeteners, plasticizers, softeners, elastomers, elastomer solvents, fillers, coloring agents and mixtures thereof to form a second mixture; and
   c. adding to said second mixture a liquid flavor component which comprises a different flavor than the encapsulated flavor component.

15. The method of claim 14 wherein the liquid flavor component and the encapsulated flavor component are respectively selected from the group consisting of a cherry-cola, grapefruit-lime/lemon; lime/lemon-grapefruit; lemon-lime; pineapple-banana; pineapple-coconut; orange-cream; strawberry-cream; cherry-vanilla; and chocolate-marshmallow.

* * * * *